United States Patent
Pollack

[15] 3,702,019
[45] Nov. 7, 1972

[54] METHOD OF MAKING DIFFUSION BONDED BATTERY PLAQUES

[72] Inventor: William Pollack, Pittsburgh, Pa.
[73] Assignee: Westinghouse Electric Corporation, Pittsburgh, Pa.
[22] Filed: April 13, 1971
[21] Appl. No.: 133,549

[52] U.S. Cl. .......................29/2, 29/419, 136/34, 136/75
[51] Int. Cl. .............................................B23p 13/00
[58] Field of Search........136/34, 35, 36, 135, 75, 65, 136/66; 29/419, 471.1, 25.17, 2

[56] References Cited

UNITED STATES PATENTS

| | | |
|---|---|---|
| 1,982,485 | 11/1934 | Salmon et al.................136/36 |
| 2,861,115 | 11/1958 | Berg.........................136/36 X |
| 3,127,668 | 4/1964 | Troy.........................29/419 X |
| 3,271,195 | 9/1966 | Berchielli et al.........136/34 X |
| 3,409,473 | 11/1968 | Weber et al..............136/75 X |

*Primary Examiner*—John F. Campbell
*Assistant Examiner*—Richard Bernard Lazarus
*Attorney*—F. Shapoe

[57] ABSTRACT

A flexible, expansible, porous, metal fiber electrode plaque is made by (1) dispersing metal fibers in a viscous liquid (2) removing the viscous liquid by vacuum filtration to provide a metal fiber felt of contacting fibers (3) metallurgically bonding the contact points of the fibers in the felt together to provide bonded annealed fibrous plaques and bus connectors (4) coining the annealed plaque to provide a plaque having a body portion of between 70 and 97 percent porosity and a bus connector portion of up to 70 percent porosity, by pressing the bus connectors into contact with predetermined areas of the plaque and then (5) metallurgically bonding the contact points of the plaque and bus connectors together.

6 Claims, 6 Drawing Figures

METHOD OF MAKING DIFFUSION BONDED BATTERY PLAQUES

BACKGROUND OF THE INVENTION

Electrode plaques for battery cells have been made as cast grid structures, expanded metal or woven wire screens and sintered powder or metal sheets. These structures generally have one of the disadvantages of having poor retention of active components due to large pore structures, low energy density due to small pore volumes or high electrical resistance.

An electrode plaque of diffusion bonded, substantially unidirectional, protective coated iron base fibers, described in copending application U.S. Ser. No. 764,527 now abandoned assigned to the assignee of this invention, reduced all of the prior art disadvantages and led to the development of improved high energy density battery cells made by the improved method of this invention.

It was found that the optimization of battery cells was possible by modification and improvement of the method of making metallic fiber skeletons taught by Troy in U.S. Pat. No. 3,127,668. Not all the parameters disclosed in the Troy patent produce skeletons suitable as the starting point in making electrode plaques. As part of my invention, I have established critical porosity ranges and bonding sequences and techniques.

SUMMARY OF THE INVENTION

My invention relates to an improved method of making flexible, diffusion bonded, fiber metal, electrode plaques for use in battery cells such as nickel-cadmium and nickel-iron systems.

My improved method provides these plaques by: (1) machining foil, bar stock or wire to provide cold worked hardened, metal fibers having a cross section of between about 0.0005 to 0.005 inches and a length of between about one eighth to 1½ inches (2) dispersing the fibers in a viscous liquid to provide a slurry of metal fibers (3) pouring the slurry into a chamber having a porous filter bed bottom plate (4) applying a vacuum on the slurry to rapidly expel the liquid and leave a uniform density of felted, contacting fibers on the filter bed plate (5) washing the felt (6) metallurgically bonding the contact points of the cold worked fibers in each felt together in a non-oxidizing atmosphere such as a vacuum, inert or protective atmosphere at about 800° to 1,300° C, to provide flexible, bonded, annealed fibrous plaques and bus strips (7) placing the annealed plaque onto the lower platen of a coining die having a flat surface (8) placing a center platen having a channel pattern cut therethrough on top of the plaque (9) placing the annealed, bus felt strips into the channels of the center platen (10) positioning a top platen, with projections matching the channel pattern of the center platen, so that it projects through the channel pattern of the center platen (11) compressing the platens at a pressure of between about 9,000 to 20,000 psi, to provide a plaque about 70 to 97 percent porous, with bus connection areas matching the channel pattern of the center platen which are up to about 70 percent porous (12) metallurgically bonding the fiber contact points of the plaque and bus strips together in a non-oxidizing atmosphere such as a vacuum, inert or protective atmosphere at about 800° to 1,300°C to insure the formation of the maximum number of fiber contact areas and increase mechanical strength (13) cutting the battery plaque to size and (14) attaching a nickel foil tab to the plaque in a coined bus area.

BRIEF DESCRIPTION OF THE DRAWINGS

For a better understanding of the invention, reference may be made to the preferred embodiments, exemplary of the invention, shown in the accompanying drawings, in which.

DESCRIPTION OF THE PREFERRED EMBODIMENTS

Figure 1:
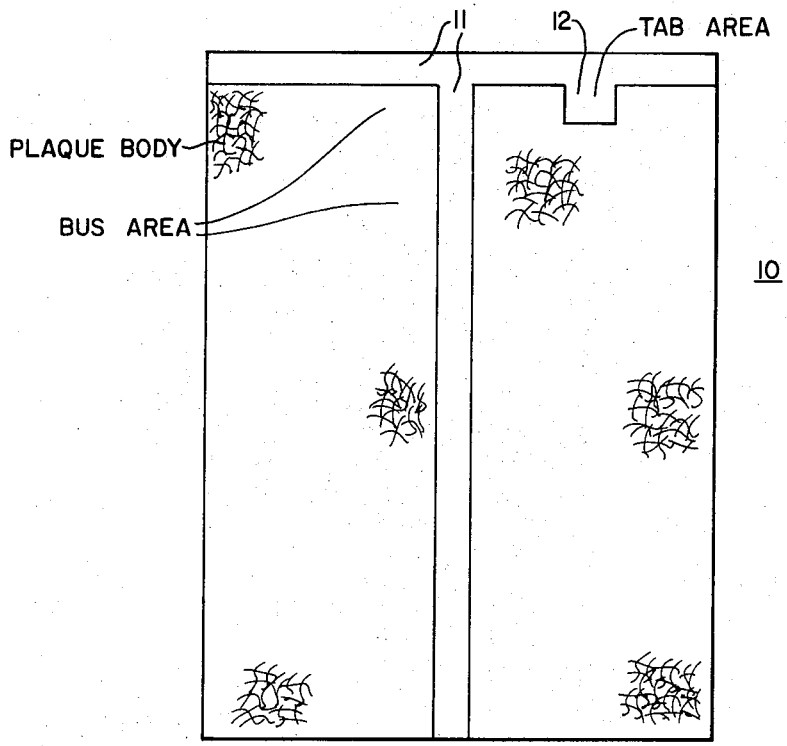
FIG. 1 shows one configuration of our unloaded electrode plaque.
Figure 2:
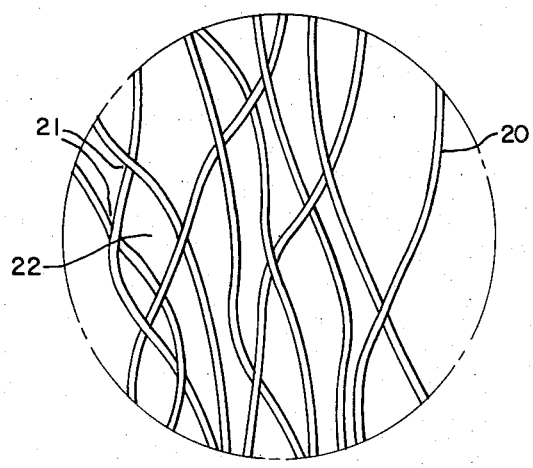
FIG. 2 shows a magnified view of the diffusion bonded metallic fibers of the plaque of FIG. 1.

Referring to FIG. 1 of the drawings, an electrode plaque 10 comprises a diffusion bonded, metallic, fibrous sheet with highly coined bus and tab areas. The sheet is shown after diffusion bonding at great magnification in FIG. 2 and consists of intermingled, annealed, fine conductive fibers 20, such as nickel or iron fibers. The fibers are diffusion bonded at their contact points to form metal to metal bonds at a multiplicity of crossover points 21 between fibers in the plaque. Active material will be contained in the pore area 22 between the bonded fibers in the loaded plaque.

In the process of this invention, the fibers must not be melted together. There must only be an interdiffusion of atoms across the fiber interface. If iron fibers are used, they can be coated, but only after diffusion bonding to insure low electrical resistivity in the coated fiber structure. It should be apparent from FIG. 2 and the description herein that the metal fibers are relatively smooth and even and are essentially free of clefts and protuberances. Also, the plaque consists only of metal fibers into which active material is directly intruded. There are no metal powder particles nor a metal sponge structure.

The flexible fibrous plaque 10 shown in FIG. 1 has a high density bus connector area 11 and tab area 12. A lead tab will generally be connected to the tab area. Both positive and negative battery plaques may be made using this construction. The difference between the positive and negative electrodes resides in the active electrode material applied or, in some cases, the metallic coatings (copper, nickel, silver, zinc or cadmium) applied to the metal plaques after diffusion bonding.

If iron fibers are used, the electrical conductivity as well as the electrode characteristics of the bonded fiber plaque may be improved by coating the bonded plaques with one or more essentially continuous, thin layers, about 0.0001 to 0.001 inches thick, of electrically conductive material. In particular, electrodeposits of metals such as copper, nickel, silver, zinc and cadmium help improve the efficiency and life of the electrode, providing such coating does not constitute an impurity element for the intended electrode system. The choice of coating is determined by the type of battery system in which the plaque is to be used.

Figure 3:
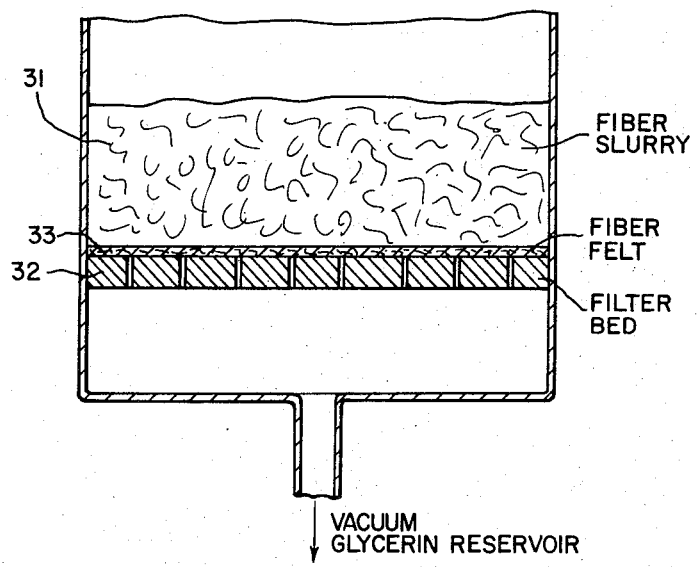
FIG. 3 shows a cross-sectional view of the casting apparatus used to make the electrode plaques of this invention.

The casting apparatus used in Example 1 is shown in FIG. 3. Metal fibers, preferably nickel fibers, are obtained by machining foil, bar stock, wire, etc. to process sheared, cold worked, hardened, fibers of ½ to 5 mil cross section and lengths ranging from one eighth to 1½ inches. The fibers because of a long length to cross section ratio (needed to achieve a high porosity plaque) do not have flow properties such as metal powders and thus must be dispersed in a fluid (gas or liquid) from which a felt or web of uniform distribution is obtained.

The fibers are added to a mixing container full of glycerin, sodium carboxy methyl cellulose or other gell or viscous water soluble, non-foaming liquid, to form a slurry of metal fibers. The slurry is vigorously stirred until the fibers are dispersed in the liquid. The slurry is then deposited into the chamber 31 of the casting apparatus, which also has a porous filter bed plate 32 and a reservoir under the filter bed. A vacuum is then applied causing a pressure differential of between about 20 to 30 in. of Hg. to exist on the slurry. The liquid is rapidly expelled through the filter bed leaving the fibers on the filter bed. Because of the rapid removal of liquid due to the relatively high vacuum, the fibers are prevented from settling out, and a uniform density of fibers will form in a fiber felt 33 over the filter bed, since the slurry will tend to flow more rapidly in those regions where the fiber density is the lowest.

The fiber felt is then removed from the casting apparatus and transferred to a water rinse table and then to a drying oven maintained at about 125°C to remove the excess liquid, or to an oven held at a temperature of 250° to 300°C where the excess liquid is rapidly removed. In order not to disturb the fiber felt during washing, it is placed between perforated stainless steel sheets and carefully lowered into a water tank. The fiber felts, without glycerin to act as a "binder" after the washing and drying steps are very fragile and extreme care must be exercised in their handling. Bus connector materials are produced by the same felt, wash and dry procedure.

The washed and dried felts for plaque and bus connectors are stacked onto a metal boat with porous ceramic paper separating each felt. The boat is then stoked into a furnace maintained between about 800° to 1,300°C in a non-oxidizing atmosphere. Generally a hydrogen gas atmosphere is used. At these temperatures the fiber contact points in the fiber felt are metallurgically solid state bonded together, wherein there is no melting but an interdiffusion of metal atoms across the fiber interface, and a simultaneous annealing or softening of the cold worked fibers. The fibers remain relatively smooth and do not form melt globules which would reduce the plaque pore area. The bonded, annealed fibrous plaques and bus connectors may then be cleaned with a vacuum cleaner to remove any char products from the paper separator sheets used between the fiber felts in the furnace.

Figure 4:
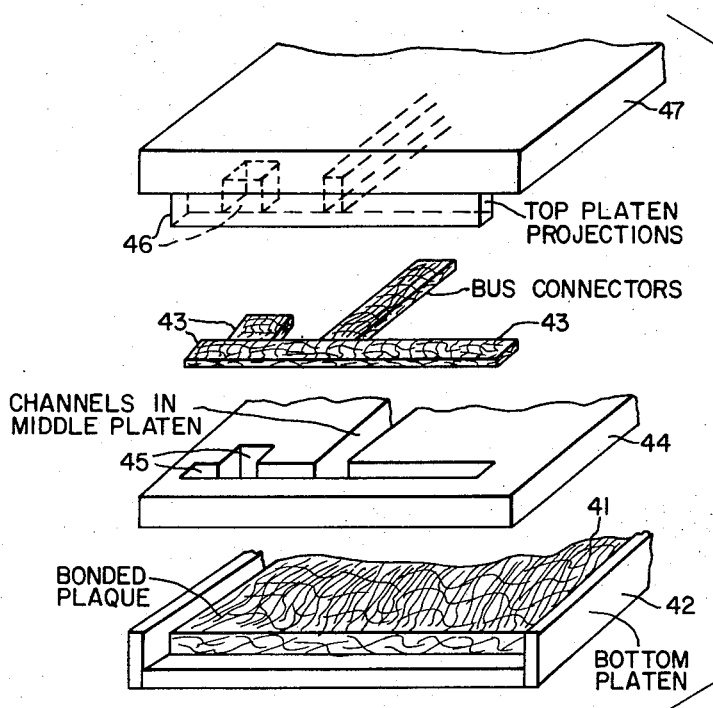
FIG. 4 shows a three dimensional view of the coining apparatus used to make the electrode plaques of this invention.

After weighing and checking for uniformity the top edge of the bonded plaque is trimmed in a paper cutter. The softened, annealed plaque 41 is then placed onto the flat, bottom platen 42 of the coining apparatus shown in FIG. 4. The coining apparatus serves a dual function of coining the thickness and the bus connectors 43 simultaneously. The lower platen is elevated by a hydraulic pump until the bonded, annealed plaque 41 is in contact with a middle platen 44 having grooves or a channel 45 cut therethrough. This channel pattern will conform to the highly coined bus connector and tab areas that are desired on the plaque. The bonded, annealed, bus connectors 43 are inserted into the channel 45 in the middle platen 44. The platens are then elevated until the projections 46 of the top platen 47, which match the channel pattern of the middle platen, are caused to project through the middle platen and cause the annealed bus connectors to contact the annealed plaque. Since the thickness of the projections 46 will be greater than the thickness of the middle platen 44, the projection will move through the channel in the middle platen and coin the bus connector and tab areas of the plaque to a higher density than will the middle platen. As can be seen in FIG. 4, the top platen projections will slide through and are complementary to the channels in the middle platen. Generally, between about 9,000 to 20,000 psi will be sufficient to coin the plaque. The fiber density in the body of the plaque will generally be between 3 and 30 percent (i.e. 97 and 70 percent porous) whereas the density at the highly coined bus connector and tab areas will be about 50 percent.

Using fiber metal in the bus connection areas insures a maximum of metal contact with a minimum weight per unit area over the length of the bus connection and therefore a reduction in electrical resistivity regardless of plate size. Since electrical resistivities of fiber metal structures increase as density decreases, it is most important that maximum fiber bonds be established and that adequate bussing be provided in the plaque for electron conduction. Metal foil used in the bus areas for improved electrical resistivity would necessitate many spot welds to insure maximum contact with the plaque, or if an attempt is made to produce more fiber to foil contacts during the metallurgical bonding operation, it would require some fixturing, increased time and possibly increased temperature, possibly causing some fiber melting.

If an attempt is made to coin the low density fiber felts prior to metallurgically diffusion bonding, it will become evident that shrinkage of the fiber metal structure during the subsequent heat treatment will cause a loss of size control of the plaque. Furthermore, attempts at forming a mechanical bond between the fibers of the plaque and the bus sections will not be successful unless the fibers are in an annealed or softened condition.

The coined bonded plaque is then diffusion bonded for the second time under conditions similar to those described above. The re-diffusion bonding operation causes additional mechanical fiber contacts, made in the coining operation, to become attached metallurgically. This process step insures the formation of a maximum number of fiber contact areas with resultant reduction in electrical resistivity, as well as increased mechanical strength in the plaque. Whereas the shrinkage in linear dimensions in the first diffusion bonding operation may be 5 to 10 percent, it is found that re-diffusion bonding an annealed fiber structure will not result in any apparent shrinkage and therefore maximum dimensional stability is obtained.

The plaque is then trimmed to size by a suitable shearing operation and nickel foil tabs attached to the plaque in the coined tab area by spot welding or the like.

If iron fibers are used rather than nickel fibers, the plaque can be uniformly plated (about 0.2 mils coating) with nickel, cadmium, copper, silver or zinc at this point, i.e. after the diffusion bonding. If plating precedes diffusion bonding, the nickel plating and steel base metal form a high resistance nickel-iron alloy during diffusion bonding which results in a high internal resistance and subsequent poor battery properties.

The plaque is now ready for plate manufacture in which suitable active electrode materials such as nickel hydroxide for positive electrodes and zinc hydroxide, cadmium hydroxide or iron hydroxide for negative electrodes can be loaded into the porous plaque by pasting or aqueous slurry techniques. These loaded active electrode plaques can then be used as positive and negative plates in batteries containing a plurality of suitably connected positive and negative plates with separators and electrolyte solution therebetween.

Figure 5:
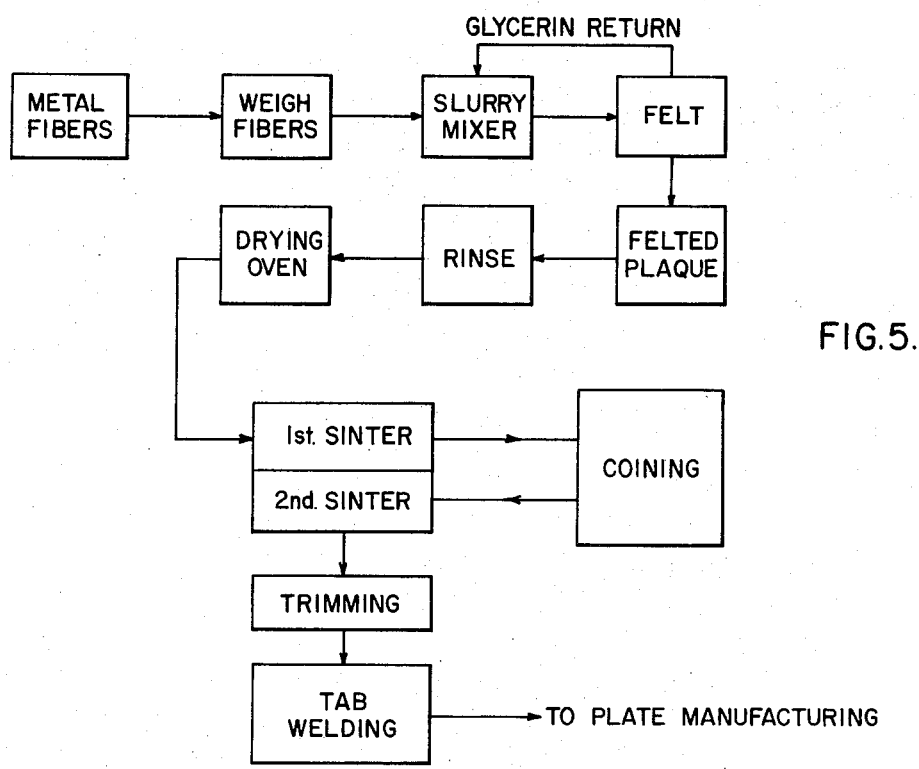
FIG. 5 shows a flow diagram of the method of this invention.

A flow diagram of this manufacturing process is shown as FIG. 5 in the drawings.

EXAMPLE 1

Nickel fibers were obtained by machining 0.001 inch electroformed nickel foil, to process sheared fibers having a cross section of 0.001 × 0.002 by one-fourth inch long. A weight of 123 grams of fibers, sufficient to simultaneously felt two plaques, was added to approximately 4 gallons of glycerine in a mixing container. The slurry was vigorously stirred for approximately 3 minutes using an air mixer tilted slightly off center so that a vortex was created, causing thorough mixing and agitation of the slurry.

The slurry was then poured into the casting apparatus shown in FIG. 3 of the drawings having a plastic top and a steel bottom. The filter bed in the chamber was divided in half by a 3 inch high plastic separator so that two fiber felts could be produced at one casting. The filter bed consisted of 2 rigid brass screens covered by 2 sheets of filter paper. When the slurry was transferred to the chamber, the filter bed was opened to an evacuated reservoir. A differential pressure of 25 inches of Hg was thus applied on the slurry to cause a rapid flow of glycerine through the filter bed. Since the fibers are too coarse to go through the filter paper they will pile up on both sides of the plastic separator in a somewhat random distribution but to a uniform thickness over the total area of the filter bed because, at vacuum, the slurry will tend to flow more rapidly in those regions where the fiber density is the lowest.

When the felting operation was completed (about 40 seconds), the valve to the vacuum pump was closed. It is impossible to remove all the glycerine from the felt in the felting operation. Preferably the glycerine is removed in a rinse operation since direct diffusion bonding of the felt in a hydrogen furnace would produce methane gas increasing pressure in the furnace and also form carbon soot and tar deposits.

The fiber felts were carefully removed from the filter bed on the topmost brass screen and a flat sheet of perforated stainless steel was placed over the felts. The assembly was then turned over and the filter papers carefully removed. Another sheet of perforated stainless steel was used to sandwich the fiber felts. The assembly was placed on a holder, lowered into a water bath and washed for about 2 hours. The assembly was then drained for 1 hour and transferred to an oven at 135°C for about 2 hours to dry. The assembly was then cooled, the top steel sheet removed and the fiber felts transferred onto a sheet of porous ceramic paper.

Bus connector felts were made in the same way except that 35 grams of fibers were used per 4 gallons of glycerine and a filter bed size of 9¼ × 14⅝ inches was used with plastic separators to provide 11 sets of narrow fiber felts per felting operation. The bus connectors were felted directly onto porous ceramic paper placed over brass screens and were washed, dried in an oven at 135°C and cooled.

The washed and dried fiber felts and bus connectors were stacked onto a stainless steel tray with porous ceramic paper separating each felt. The tray was passed into the first of three hot zones from the back of a furnace maintained at 1,195°C ± 10°C with a hydrogen gas flow of 200 to 250 CFH. The tray remained in the hot zone approximately 45 minutes to diffusion bond and anneal the contacting metal fibers of the felts and then was passed to the successive cooler zones of the furnace. The annealed, metallurgically diffusion bonded felts were then removed from the furnace and the tray and cleaned with a vacuum cleaner to remove char products from the separator material. The temperature of the furnace hot zone must be maintained such that there is only interdiffusion of metal across the contacting fiber interface. The fibers must not be melted or globules will form reducing pore volume within the plaque.

The top edge of each plaque was trimmed in a paper cutter to provide a 8¾ × 6¾ inches flexible, bonded sheet of about 95 percent porosity (i.e. 5 percent of theoretical density). The bus sheets sets were of approximately one half × 7⅛ inches, one half × 9 3/16 inches and 1⅝ × one half inches sizes and about 95 percent porous. The plaques were then weighed and examined for uniformity of fiber before coining.

The highly porous, flexible, diffusion bonded, annealed plaque was then placed onto the flat lower platen of the coining apparatus shown in FIG. 4 of the drawings. This apparatus had a middle platen with a channel T shaped opening through it, as shown in FIG. 4, which corresponded to the bus and tab areas shown in FIG. 1. The top platen of the apparatus had projections of the same shape and area as the openings in the middle platen. These projections fitted through the middle platen channel and were thicker than the middle platen so that when the top and middle platens were in contact and fitted together the projections projected through and extended beyond the middle platen.

The lower platen was elevated by a hydraulic pump until the plaque was in contact with the middle platen. The diffusion bonded annealed bus connectors were doubled up lengthwise and inserted into the grooves in the center platen. The loose and frazzled edges of the bus members were placed in contact with the open structure of the plaque for maximum interlocking of members. The platens were then elevated until the projections in the top platen passed through the grooves in the middle platen and caused the bus connectors to contact the plaque. A pressure of about 18,000 psi was used to compress the flexible fiber metal plaque body to a thickness of 0.05 inch and the bus and tab areas to a thickness of 0.025 to 0.03 inches. The fiber density in the plaque body was about 15 percent of theoretical (85 percent porous) as compared to the density in the bus and tab areas of about 50 percent of theoretical. Attempts at forming a mechanical bond between the fibers of the plaque and the bus sections will not be successful unless the fibers are in an annealed or softened condition. The coining operation of diffusion bonded plaque and bus sections meets this condition.

The coined plaque was re-diffusion bonded under the same conditions as described above. The re-diffusion bonding operation caused additional mechanical fiber contacts, made in the coining operation, to become attached through metal to metal diffusion and insured maximum fiber contact, increased mechanical strength and reduced electrical resistivity.

The re-diffusion bonded plaque was then trimmed to size with a paper cutter and a solid nickel foil tab attached to the plaque in the coined tab area by 25 spot welds arranged in five rows of five welds.

The above procedure describes a batch type operation in which one or more plaques can be felted simultaneously. The same procedure can be used to produce plaques if a continuous felting procedure is employed. The slurry in such cases can consist of metal fiber and a viscous liquid or a mixture of metal fiber — cellulose (pulp) and a viscous water solution. The amount of fibers per unit volume of slurry would have to be adjusted to the felting rate of a Fourdinier machine to produce a finished plaque of the required density. All other operations with respect to diffusion bonding coining, re-diffusion bonding, etc. would apply.

Figure 6:
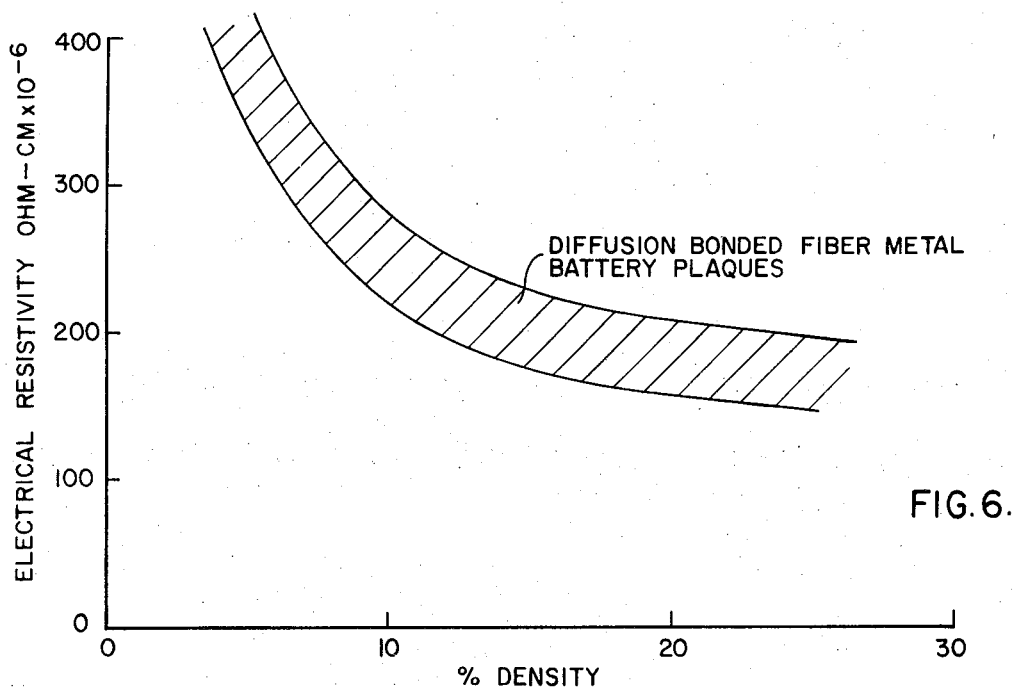
FIG. 6 shows a graph of plaque density vs. electrical resistivity for the diffusion bonded metallic fiber plaques produced by the method of this invention.

Using the process described above, battery plaques have been produced with electrical resistivities of 180 micro ohm-cm at 15 percent of theoretical density. FIG. 6 shows a graph of plaque density vs. electrical resistivity for plaques produced by this method. The electrical resistivities of the fiber metal structure will increase as the density of the structure decreases and it is most important that the maximum fiber bonds be established and that adequate bussing be provided in the plate for electron conduction.

I claim:

1. A method of producing flexible, fiber metal electrode plaques comprising the steps of:
    A. dispersing metal fibers in a viscous liquid to provide a slurry of metal fibers,
    B. depositing the slurry onto a porous plate,
    C. removing the viscous liquid from the slurry by vacuum filtration to provide a metal fiber felt of contacting fibers,
    D. metallurgically bonding the contact points of the fibers in the felt together to anneal the fibers and form a bond of diffused metal between fibers at points of physical contact, thereby providing a bonded, annealed fibrous plaque,
    E. providing annealed bonded metal fiber bus connectors,
    F. coining the bonded annealed plaque to provide a plaque having a body portion of between 70 and 97 percent porosity and a bus connection portion of up to 70 percent porosity by pressing the annealed bus connectors into contact with predetermined areas of the annealed plaque, and finally
    G. metallurgically bonding the contact points of the plaque and bus connectors together to form a bond of diffused metal between fibers at points of physical contact.

2. The method of claim 1 wherein the metallurgical bonding is at a temperature between about 800° to 1,300°C in a non-oxidizing atmosphere, and as a last step a nickel tab is attached to the plaque.

3. The method of claim 2 wherein the metal fibers have a cross section of between about 0.0005 and 0.005 inches and a length of between about one eighth and 1½ inches and the coining is accomplished by:
    i. placing the annealed bonded plaque on top of a flat bottom platen,
    ii. placing a middle platen on top of the bonded plaque, said middle platen having a predetermined channel cut therethrough,
    iii. placing bonded, annealed bus connectors in the middle platen channel,
    iv. placing a top platen on top of the middle platen, said top platen having projections which slide through the channel cut through the middle platen and project through the middle platen to cause the bus connectors to contact the plaque and
    v. pressing the top and bottom platens together.

4. The method of claim 2 wherein the metal fibers are nickel fibers and the metal fiber felt is washed between step (C) and (D).

5. The method of claim 2 wherein the metal fibers are iron fibers, the metal fiber felt is washed between step (C) and (D) and as a final step a metal coating selected from the group consisting of nickel, cadmium, copper, silver and zinc is deposited on the bonded fibers of the electrode plaque.

6. The method of claim 2 wherein the non-oxidizing atmosphere is a hydrogen atmosphere.

* * * * *